US012679467B2

(12) United States Patent (10) Patent No.: US 12,679,467 B2
Shim et al. (45) Date of Patent: Jul. 14, 2026

(54) UPPER RAIL STRUCTURE FOR VEHICLE

(71) Applicants: Hyundai Motor Company, Seoul (KR); Kia Corporation, Seoul (KR)

(72) Inventors: Jaeha Shim, Goyang-Si (KR); Juwon Lee, Hwaseong-Si (KR); Jae Hoon Jung, Pyeongtaek-Si (KR); Songjae Jeong, Seongnam-Si (KR); ChulHyun Kim, Pyeongtaek-Si (KR); Bong Guen Kwon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 396 days.

(21) Appl. No.: 18/379,938

(22) Filed: Oct. 13, 2023

(65) Prior Publication Data

US 2024/0208580 A1 Jun. 27, 2024

(30) Foreign Application Priority Data

Dec. 27, 2022 (KR) ........................ 10-2022-0185892

(51) Int. Cl.
*B62D 25/04* (2006.01)
*B60J 5/06* (2006.01)
*B62D 25/06* (2006.01)
(52) U.S. Cl.
CPC ............. *B62D 25/06* (2013.01); *B62D 25/04* (2013.01); *B60J 5/06* (2013.01)
(58) Field of Classification Search
CPC ........ B62D 25/02; B62D 25/04; B62D 25/06; B60J 5/06; B60J 5/062; B60J 5/065; B60J 5/067; B60J 5/08

USPC ........... 296/187.12, 187.13, 193.05, 193.12, 296/203.03, 210, 155
See application file for complete search history.

(56) References Cited

U.S. PATENT DOCUMENTS

| | | | |
|---|---|---|---|
| 9,718,497 B2 * | 8/2017 | Nakayama | B62D 27/023 |
| 12,103,309 B2 * | 10/2024 | Zapata | B41J 2/175 |
| 2005/0212333 A1 * | 9/2005 | Mally | B62D 25/04 |
| | | | 296/203.03 |
| 2014/0327273 A1 * | 11/2014 | Yasukata | B62D 27/02 |
| | | | 296/203.03 |
| 2016/0297480 A1 * | 10/2016 | Nakayama | B62D 21/157 |
| 2019/0047629 A1 * | 2/2019 | Asa | B62D 27/023 |
| 2023/0182549 A1 * | 6/2023 | Song | B62D 25/06 |
| | | | 296/203.03 |
| 2024/0208580 A1 * | 6/2024 | Shim | B62D 25/04 |
| 2025/0091660 A1 * | 3/2025 | Kim | B62D 25/06 |

* cited by examiner

*Primary Examiner* — Gregory A Blankenship
(74) *Attorney, Agent, or Firm* — MORGAN, LEWIS & BOCKIUS LLP

(57) ABSTRACT

A vehicle-body-integrated upper rail structure is provided at an upper side of a door opening portion formed in a vehicle body and includes: a rail portion including a rail opening that provides a sliding route for a door and is formed in a longitudinal direction of the vehicle body; a pillar connection portion extending from the rail portion toward a lower side of the vehicle body and connected to a pillar, and a roof rail connection portion extending from an upper end portion of the rail portion toward a center portion of the vehicle body and connected to a roof rail of the vehicle body.

16 Claims, 13 Drawing Sheets

UPPER RAIL STRUCTURE FOR VEHICLE

CROSS-REFERENCE TO RELATED APPLICATION

The present application claims priority to Korean Patent Application No. 10-2022-0185892 filed on Dec. 27, 2022, the entire contents of which is incorporated herein for all purposes by this reference.

BACKGROUND OF THE PRESENT DISCLOSURE

Field of the Present Disclosure

The present disclosure relates to an upper rail structure for a vehicle, and more particularly, to a vehicle-body-integrated upper rail structure for a vehicle, which is provided on an upper portion of a door opening portion and configured as a single integrated component that serves as a vehicle body.

DESCRIPTION OF RELATED ART

In general, a vehicle has an occupant compartment having a predetermined size in which a driver or an accompanied occupant may be accommodated, and occupant compartment opening/closing doors are provided on a vehicle body to open or close the occupant compartment.

In the case of a passenger vehicle, the occupant compartment opening/closing doors include a front door provided at a front side in a longitudinal direction of the vehicle and a rear door provided at a rear side in the longitudinal direction of the vehicle. The front door and the rear door are typically provided on the vehicle body to be rotatable by hinges.

Meanwhile, in the case of a van in which many persons may be accommodated, the occupant compartment opening/closing doors slide forward and rearward in the longitudinal direction of the vehicle to open or close the occupant compartment.

In the case of the slide-type occupant compartment opening/closing door for a van, the occupant compartment opening/closing door is configured to move rearward in the longitudinal direction of the vehicle to open the occupant compartment, and move forward in the longitudinal direction of the vehicle to close the occupant compartment. Therefore, the slide-type occupant compartment opening/closing door has an advantage in that a space required to open or close the door is smaller in the slide-type occupant compartment opening/closing door than in the hinged occupant compartment opening/closing door applied to the passenger vehicle and a door opening formed in the vehicle body may be completely opened even though the space required to open or close the door is small.

As illustrated in FIG. 1A, FIG. 1B, FIG. 1C, and FIG. 1D, a slide-type occupant compartment opening/closing door in the related art has a lower sliding rail 4 having an upper side coupled to an upper rail 10 provided on a side roof rail 3 disposed between a B-pillar 7 and a C-pillar 9, an upper sliding rail 2 coupled to an upper portion of the lower sliding rail 4, stoppers 8 disposed at two opposite ends of the upper sliding rail 2, and a roof rail panel 6 configured to cover the lower sliding rail 4 and the upper sliding rail 2. A bearing 12 provided on a door arm 14 is inserted into the upper sliding rail 2 so that a door moves along a sliding trajectory of the upper sliding rail 2. However, abrasion or misalignment occurs because of friction between the bearing and the sliding rail in the structure of the upper rail 10 made by coupling the plurality of above-mentioned components. Furthermore, in case that a gap or a void is formed in a portion where the components are in contact with each other, there is a problem of deterioration in watertightness performance and Noise, Vibration, and Harshness (NVH) performance.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle-body-integrated upper rail structure, which is configured as a single component, manufactured by an aluminum casting process method, precisely processed, and adopted as a portion of a vehicle body, basically preventing problems such as noise and abrasion that occurs in a configuration in which a plurality of components is assembled.

An exemplary embodiment of the present disclosure provides a vehicle-body-integrated upper rail structure, which is provided at an upper side of a door opening portion formed in a vehicle body, the vehicle-body-integrated upper rail structure including: a rail portion including a rail opening that provides a sliding route for a door and is formed in a longitudinal direction of the vehicle body: a pillar connection portion extending from the rail portion toward a lower side of the vehicle body and connected to a pillar; and a roof rail connection portion extending from an upper end portion of the rail portion toward a center portion of the vehicle body and connected to a roof rail of the vehicle body.

The vehicle-body-integrated upper rail structure according to the exemplary embodiment of the present disclosure may further include a vehicle body connection portion extending from the upper end portion of the rail portion in the longitudinal direction of the vehicle body and connected to the vehicle body.

The pillar connection portion may include: a B-pillar connection portion extending from a lower end portion of the rail portion toward the lower side of the vehicle body and connected to a B-pillar; and a C-pillar connection portion extending from the lower end portion of the rail portion toward the lower side of the vehicle body and connected to a C-pillar.

The rail opening may be formed through the rail portion in an upward and downward direction, and the rail opening may be formed convex toward the outside of the vehicle body in the longitudinal direction of the vehicle body.

A protrusion may be formed on an internal surface of a lower portion of the rail opening and protrude toward the inside of the rail opening so that a bearing connected to a door arm is mounted on the protrusion and rolls on the protrusions.

The roof rail connection portion may be formed concave toward the lower side of the vehicle body to be connected to and overlap an end portion of the roof rail.

An end portion of the roof rail connection portion may be connected to the end portion of the roof rail by a blind rivet.

The vehicle body connection portion may include a stepped tunnel portion to be connected to and overlap an end portion of the vehicle body.

The vehicle body may be inserted into and connected to the stepped tunnel portion of the vehicle body connection portion, an upper side of the vehicle body may be coupled to an upper side of the vehicle body connection portion by a self-piercing rivet (SPR), and a lower side of the vehicle body may be coupled to a lower side of the vehicle body connection portion by a blind rivet.

The B-pillar connection portion and the C-pillar connection portion may respectively include stepped tunnel portions to be connected to and overlap an end portion of the B-pillar and an end portion of the C-pillar.

The B-pillar may be inserted into and connected to the stepped tunnel portion of the B-pillar connection portion, an external side of the B-pillar may be coupled to an external side of the B-pillar connection portion by a flow drill screw (FDS), and an internal side of the B-pillar may be coupled to an internal side of the B-pillar connection portion by a blind rivet.

The C-pillar may be inserted into and connected to the stepped tunnel portion of the C-pillar connection portion by an FDS.

A guard bracket may be coupled to cover an external surface of the B-pillar connection portion and an external surface of the C-pillar connection portion, and the guard bracket may be coupled to the external surface of the B-pillar connection portion and the external surface of the C-pillar connection portion by FDSs.

According to the exemplary embodiment of the present disclosure, the vehicle-body-integrated upper rail may be produced as a single component by use of an aluminum casting process method, which may eliminate in advance the factor of degradation of assembling quality due to tolerance that occurs at the time of assembling a plurality of components.

Furthermore, it is possible to prevent a dimension defect between components, an assembling defect, and deteriorations in watertightness performance and noise, vibration, and harshness (NVH) performance caused by a gap and void between components.

Furthermore, it is possible to provide excellent trajectory dimension quality to the single component, which may solve a problem with the connection between the vehicle body component and the bearing, prevent the occurrence of noise, and reduce abrasion progression while the sliding door operates.

Furthermore, the vehicle-body-integrated upper rail, which constitutes the framework structure of the vehicle body and is configured in longitudinal/transverse/upward and downward directions, is provided, which may improve rigidity of the vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
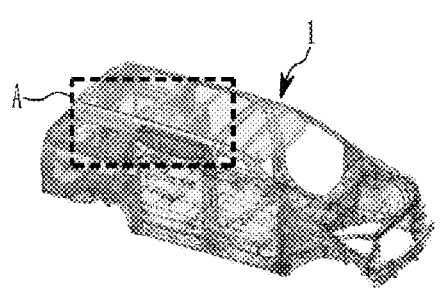
FIG. 1A, FIG. 1B, FIG. 1C, and FIG. 1D are views illustrating an upper rail structure applied to a slide-type occupant compartment opening/closing door structure in the related art.
Figure 1B:
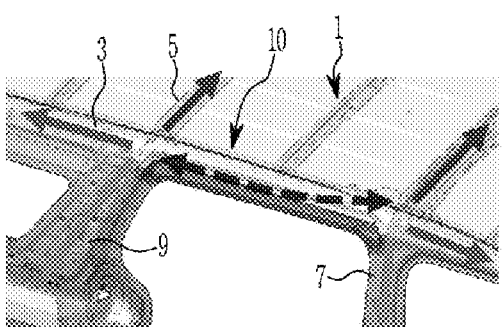
Figure 1C:
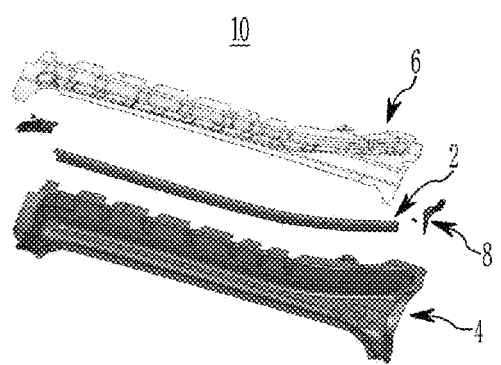
Figure 1D:
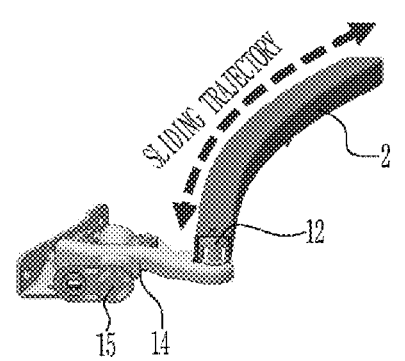

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below: While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings so that those with ordinary skill in the art to which the present disclosure pertains may easily carry out the embodiments. The present disclosure may be implemented in various different ways and is not limited to the exemplary embodiments described herein.

Furthermore, the constituent elements including the same configurations in several embodiments will be assigned with the same reference numerals and described only in the representative embodiment, and only the constituent elements, which are different from the constituent elements according to the representative embodiment, will be described in other exemplary embodiments of the present disclosure.

It is noted that the drawings are schematic and are not illustrated based on actual scales. Relative dimensions and proportions of parts illustrated in the drawings are exaggerated or reduced in size for clarity and convenience in the drawings, and any dimension is just illustrative but not restrictive. The same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

The exemplary embodiment of the present disclosure specifically illustrates an example of the present disclosure. As a result, various modifications of the drawings are expected. Therefore, the embodiments are not limited to specific forms in regions illustrated in the drawings, and for example, include modifications of forms by the manufacture thereof.

Hereinafter, a vehicle-body-integrated upper rail structure according to an exemplary embodiment of the present disclosure will be described in detail with reference to the accompanying drawings.

Figure 2:
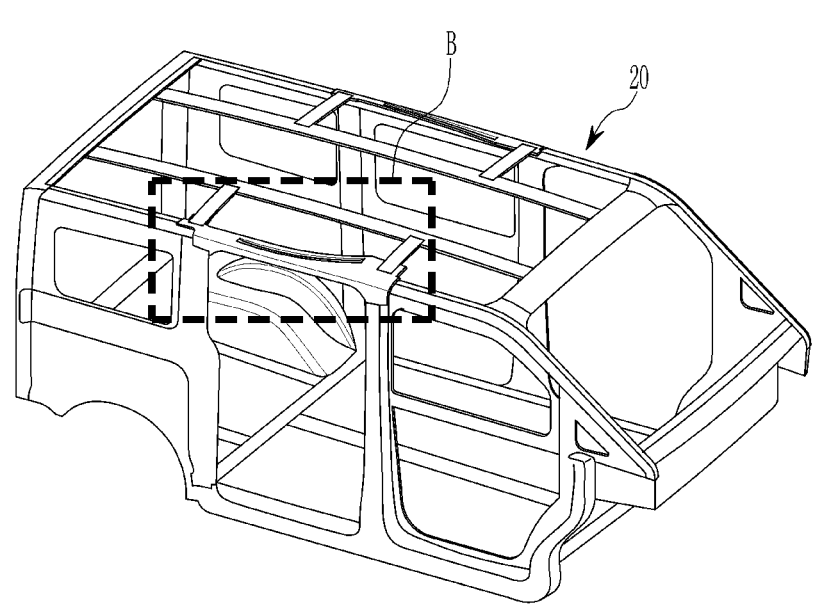
FIG. 2 is a view exemplarily illustrating a state in which a vehicle-body-integrated upper rail structure according to an exemplary embodiment of the present disclosure is provided on a vehicle body.
Figure 3:
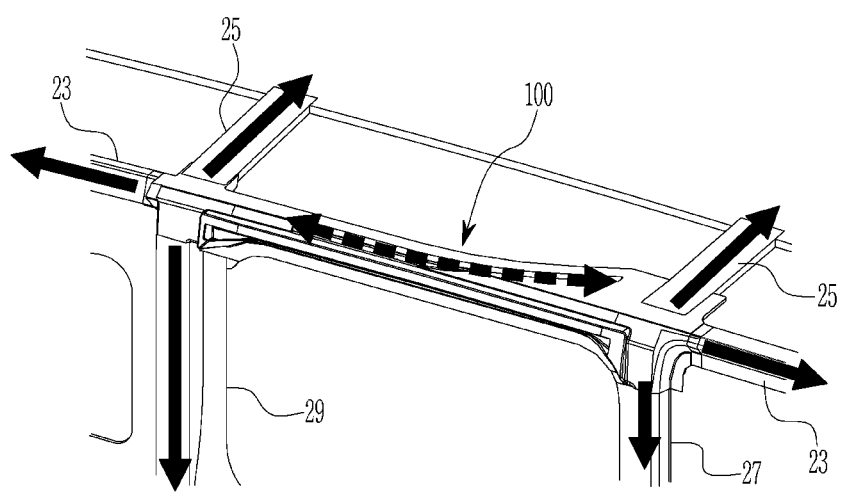
FIG. 3 is an enlarged view of part 'B' in FIG. 2.

FIG. 2 is a view exemplarily illustrating a state in which a vehicle-body-integrated upper rail structure according to an exemplary embodiment of the present disclosure is provided on a vehicle body, and FIG. 3 is an enlarged view of portion 'B' in FIG. 2.

First, with reference to FIG. 2 and FIG. 3, a vehicle-body-integrated upper rail structure 100 according to the exemplary embodiment of the present disclosure may be provided between pillars at an upper side of a door opening portion formed in a vehicle body 20, i.e., between a B-pillar 27 and a C-pillar 29. Lower portions of first and second opposite end portions of the upper rail structure 100 are respectively connected to the B-pillar 27 and the C-pillar 29. Upper portions of the first and second opposite end portions of the upper rail structure 100 are respectively connected to roof rails 25 of the vehicle body 20. Lateral portions of the two opposite end portions of the upper rail structure 100 are connected to the vehicle body 20 (23) and disposed toward front and rear sides of the vehicle body 20. Therefore, the upper rail structure 100 itself forms the vehicle body between the B-pillar 27 and the C-pillar 29.

Figure 4:
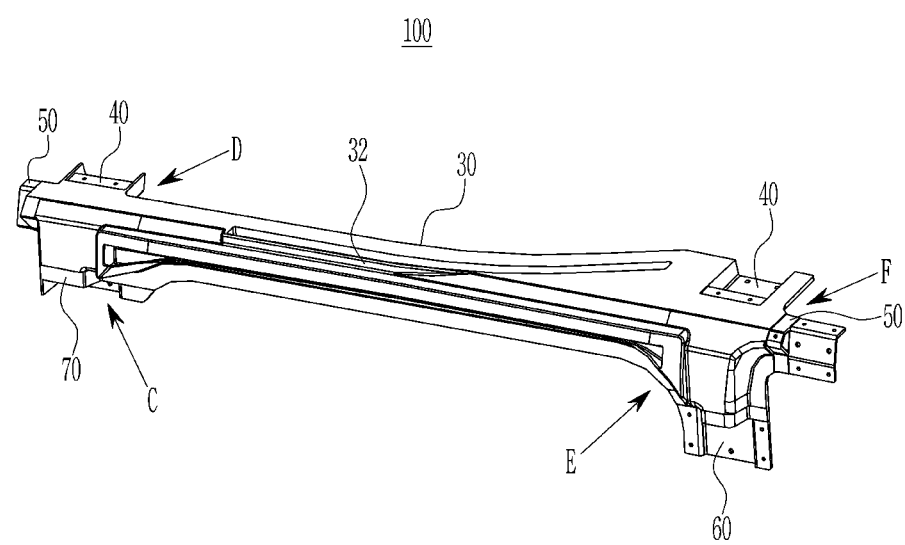
FIG. 4 is a perspective view exemplarily illustrating the vehicle-body-integrated upper rail structure according to the exemplary embodiment of the present disclosure.
Figure 5:
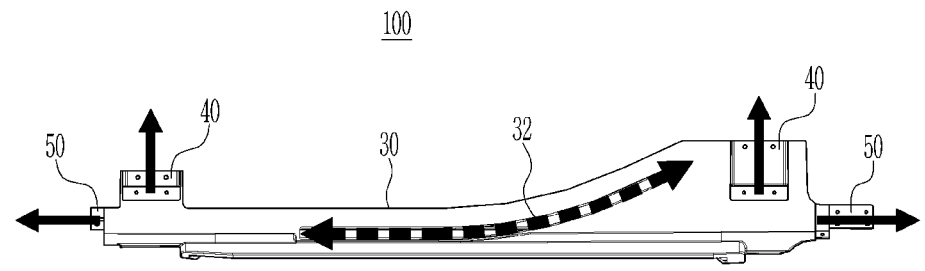
FIG. 5 is a top plan view exemplarily illustrating the vehicle-body-integrated upper rail structure according to the exemplary embodiment of the present disclosure when viewed from above.
Figure 6:
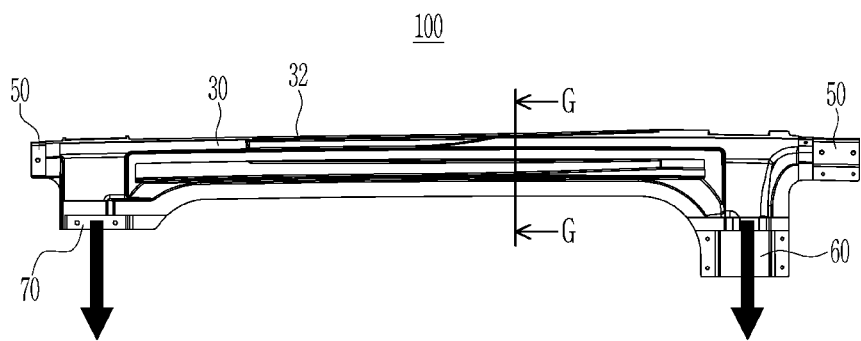
FIG. 6 is a top plan view exemplarily illustrating the vehicle-body-integrated upper rail structure according to the exemplary embodiment of the present disclosure when viewed from the front side thereof.
Figure 7:
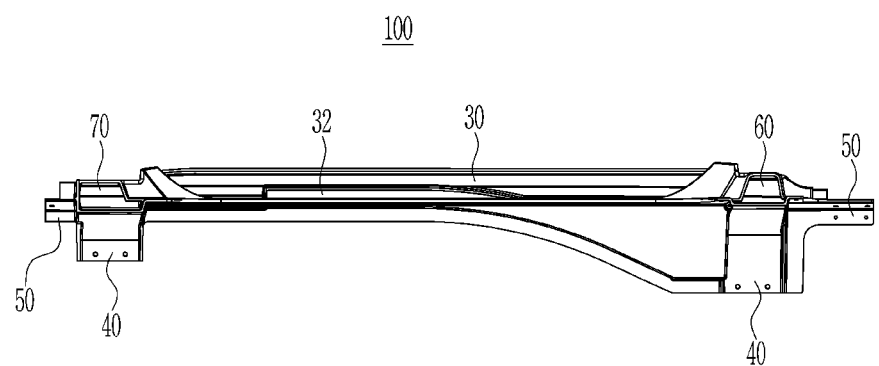
FIG. 7 is a top plan view exemplarily illustrating the vehicle-body-integrated upper rail structure according to the exemplary embodiment of the present disclosure when viewed from below.
Figure 8:
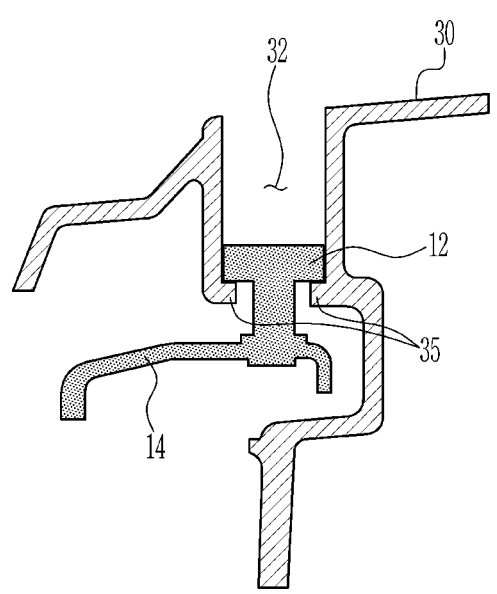
FIG. 8 is a cross-sectional view taken along line 'G-G' in FIG. 6.

FIG. 4 is a perspective view exemplarily illustrating the vehicle-body-integrated upper rail structure according to the exemplary embodiment of the present disclosure, FIG. 5 is a top plan view exemplarily illustrating the vehicle-body-integrated upper rail structure according to the exemplary embodiment of the present disclosure when viewed from above, FIG. 6 is a top plan view exemplarily illustrating the vehicle-body-integrated upper rail structure according to the exemplary embodiment of the present disclosure when viewed from the front side, FIG. 7 is a top plan view exemplarily illustrating the vehicle-body-integrated upper rail structure according to the exemplary embodiment of the present disclosure when viewed from below, and FIG. 8 is a cross-sectional view taken along line 'G-G' in FIG. 6.

With reference to FIG. 4, FIG. 5, FIG. 6, and FIG. 7, the vehicle-body-integrated upper rail structure 100 according to the exemplary embodiment of the present disclosure includes a rail portion 30, pillar connection portions 60 and 70, and roof rail connection portions 40.

Furthermore, the vehicle-body-integrated upper rail structure 100 according to the exemplary embodiment of the present disclosure may further include vehicle body connection portions 50. The pillar connection portions 60 and 70 may include a B-pillar connection portion 60 and a C-pillar connection portion 70.

The rail portion 30 is disposed between the B-pillar 27 and the C-pillar 29 and forms a center portion of the upper rail structure 100. A rail opening 32 is formed through upper and lower portions of the rail portion 30 and provided in a longitudinal direction of the vehicle body. The rail opening 32 provides a sliding route for a door. The rail opening 32 may be convex toward the outside of the vehicle body 20 in the longitudinal direction of the vehicle body 20. Therefore, when the door is opened, the door may move toward the outside of the vehicle body 20 while sliding along the rail opening 32 in a direction from the front side to the rear side of the vehicle body 20. On the other hand, when the door is closed, the door may move toward the interior of the vehicle body 20 while sliding along the rail opening 32 in a direction from the rear side to the front side of the vehicle body.

With reference to FIG. 8, a door arm 14 provided on the door may be connected to an internal surface of the lower portion of the rail opening 32. A bearing 12, which may roll, is provided on the door arm 14, and the bearing 12 may be accommodated in the rail opening 32.

Protrusions 35 may be positioned on the internal surface of the lower portion of the rail opening 32 and protrude toward the inside of the rail opening 32 so that the bearing 12 may be mounted on the protrusions and roll. The protrusions 35 protrude from the internal surface of the rail opening 32 while facing each other. The bearing 12 is mounted on the upper surfaces of the protrusions to prevent the door arm 14 from separating toward the lower portion of the rail opening 32.

The roof rail connection portions 40 are provided at upper end portions of two opposite sides of the rail portion 30 and integrated with the rail portion 30. The roof rail connection portion 40 may extend toward the center portion of the vehicle body 20 and connected to the roof rail 25 of the vehicle body 20 that extends in a direction perpendicular to the longitudinal direction of the vehicle body 20.

The roof rail connection portion 40 may include a shape concavely stepped toward a lower side of the vehicle body 20 to be connected to and overlap an end portion of the roof rail 25. That is, the end portion of the roof rail 25 may be accommodated on and connected to the concavely stepped portion of the roof rail connection portion 40.

The vehicle body connection portions 50 extend from the upper end portion of the two opposite sides of the rail portion 30 in the longitudinal direction of the vehicle body 20 and is integrated with the rail portion 30. The vehicle body connection portion 50 may be connected to the vehicle body 23 extending in the longitudinal direction of the vehicle.

The vehicle body connection portion 50 may include a stepped tunnel shape to be connected to and overlap an end portion of the vehicle body 23. That is, the end portion of the vehicle body 23 may be inserted into and connected to the inside of the stepped tunnel portion of the vehicle body connection portion 50.

The B-pillar connection portion 60 extends from a lower end portion of a front side of the rail part 30 toward a lower side of the vehicle body 20 and is integrated with the rail part 30. The B-pillar connection portion 60 may be connected to the B-pillar 27 of the vehicle body 20. Furthermore, the C-pillar connection portion 70 extends from a lower end portion of a rear side of the rail part 30 toward the lower side of the vehicle body 20 and is integrated with the rail part 30. The C-pillar connection portion 70 may be connected to the C-pillar 29 of the vehicle body 20.

The B-pillar connection portion 60 and the C-pillar connection portion 70 may respectively have stepped tunnel shapes to be connected to and overlap the end portion of the B-pillar 27 and the end portion of the C-pillar 29. That is, the B-pillar 27 and the C-pillar 29 may be respectively inserted into and connected to the stepped tunnel portion of the B-pillar connection portion 60 and the stepped tunnel portion of the C-pillar connection portion 70.

Figure 9:
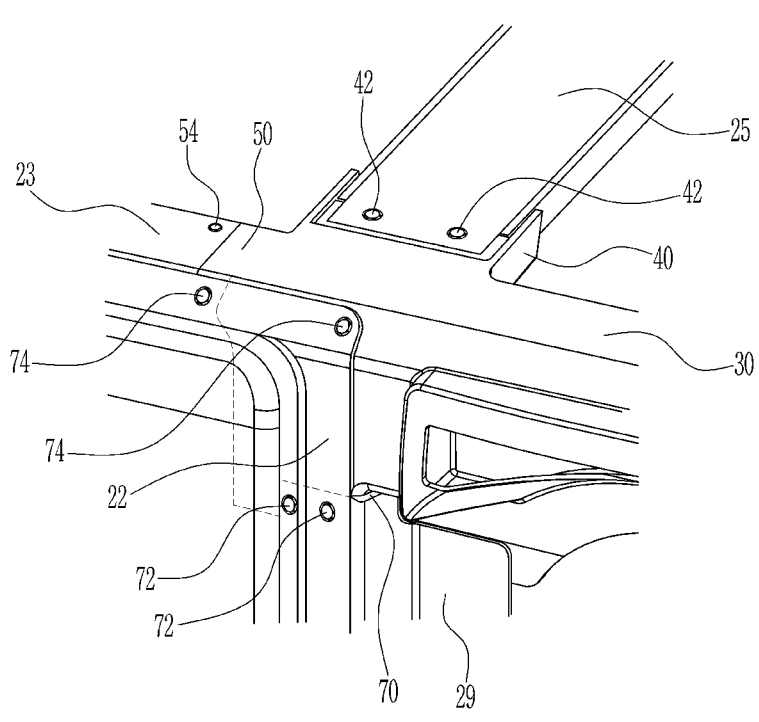
FIG. 9 is an enlarged view of part 'C' in FIG. 4.
Figure 10:
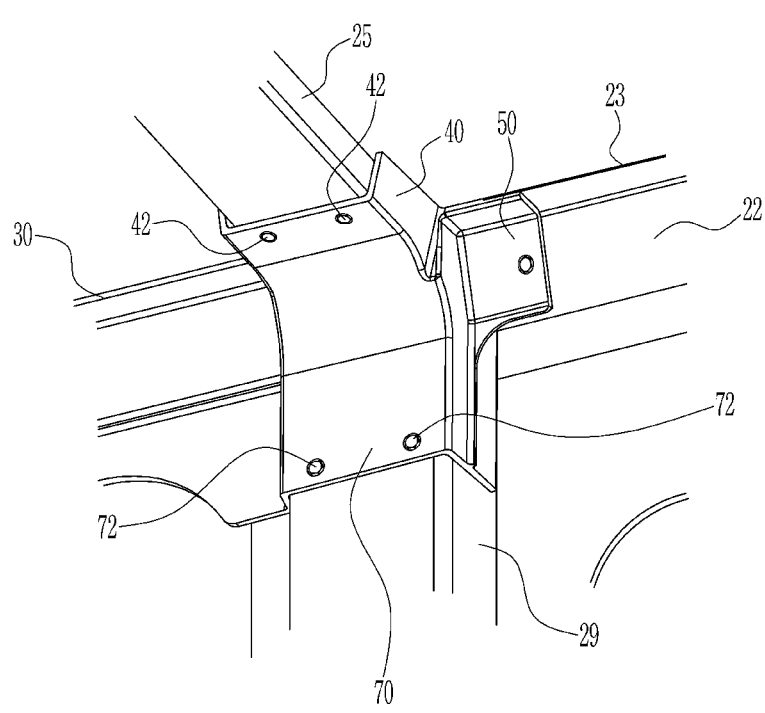
FIG. 10 is an enlarged view of part 'D' in FIG. 4.

FIG. 9 is an enlarged view of part 'C' in FIG. 4, and FIG. 10 is an enlarged view of part 'D' in FIG. 4.

With reference to FIG. 9 and FIG. 10, the roof rail connection portion 40 and the C-pillar connection portion 70, which are integrated at the end portion of the rail portion 30, extend in the direction perpendicular to the longitudinal direction of the vehicle body 20. The roof rail connection portion 40 is connected to the roof rail 25 that forms the upper portion of the vehicle body 20. The C-pillar connection portion 70 is connected to the C-pillar 29 of the vehicle body 20. Furthermore, the vehicle body connection portion 50 integrated with the end portion of the rail portion 30 extends rearward in the longitudinal direction of the vehicle body 20 and is connected to the vehicle body 23.

The roof rail 25 may be accommodated on a concavely stepped end portion of the roof rail connection portion 40 and connected by blind rivets 42. The roof rail connection portion 40 and the roof rail 25 may be respectively connected to the upper surface of the roof rail 25 and the lower surface of the roof rail connection portion 40 by the blind rivets 42. The blind rivet 42 may be provided as a plurality of blind rivets 42. A pair of blind rivets 42 may be provided on the lower surface of the roof rail 25 and the lower surface of the roof rail connection portion 40 and disposed in the longitudinal direction of the vehicle body 20. The blind rivet 42 is a rivet which may be fixed in one direction thereof. The roof rail connection portion 40 and the roof rail 25 may be continuously coupled by the blind rivets 42.

The C-pillar 29 may be inserted into and connected to the stepped tunnel portion of the C-pillar connection portion 70. The internal surface of the C-pillar connection portion 70 and the external surface of the C-pillar 29 may be coupled by flow drill screws (FDSs) 72. The FDS 72 may be provided as a plurality of FDSs 72. A pair of FDSs 72 may be disposed in the longitudinal direction of the vehicle body 20. The FDS 72 is a screw including a screw thread formed on an external surface thereof. The C-pillar 29 and the C-pillar connection portion 70 may be attached or detached by rotating the FDS 72.

The vehicle body 23 may be inserted into and connected to the stepped tunnel shape of the vehicle body connection portion 50. An upper side of the vehicle body 23 may be coupled to an upper side of the vehicle body connection portion 50 by self-piercing rivets (SPRs) 54. A lower side of the vehicle body 23 may be coupled to a lower side of the vehicle body connection portion 50 by the blind rivets 52. The coupling method using the SPR 54 utilizes a press-fitting method that facilitates automation and decreases working time without requiring a separate hole for a rivet. The SPRs 54 and the blind rivets 52 may be respectively provided one by one.

Meanwhile, a guard bracket 22 may be coupled to cover the external surface of the C-pillar connection portion 70. The guard bracket 22 may be coupled to the external surface of the C-pillar connection portion 70 by the FDS 72.

Figure 11:
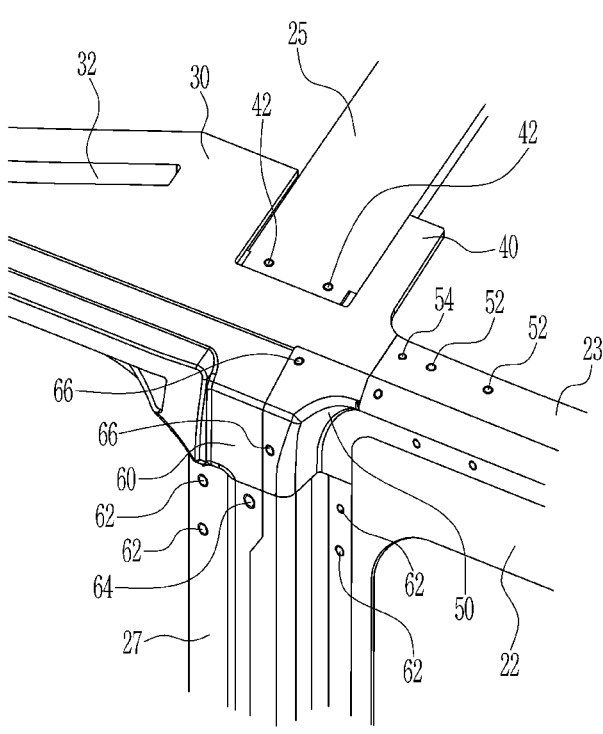
FIG. 11 is an enlarged view of part 'E' in FIG. 4.
Figure 12:
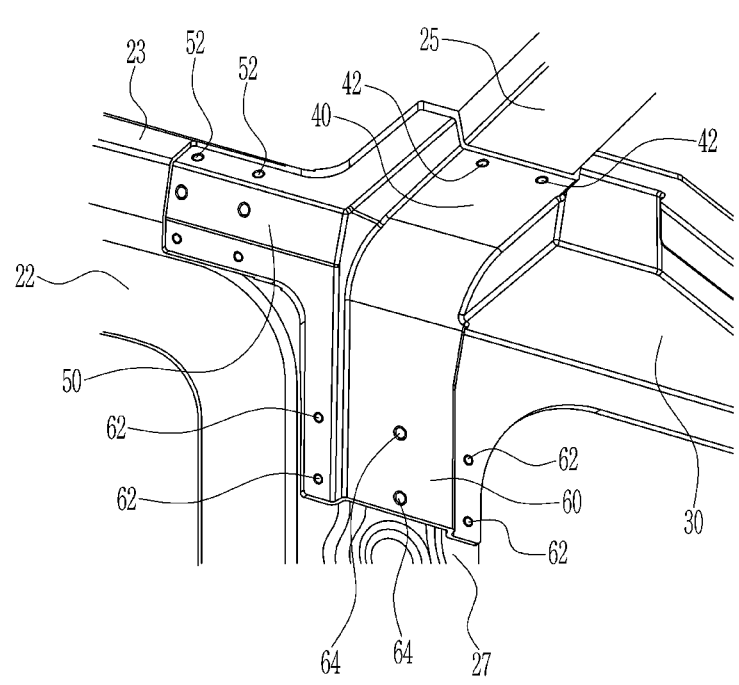
FIG. 12 is an enlarged view of part 'F' in FIG. 4.

FIG. 11 is an enlarged view of part 'E' in FIG. 4, and FIG. 12 is an enlarged view of part 'F' in FIG. 4.

With reference to FIG. 11 and FIG. 12, the roof rail connection portion 40 and the B-pillar connection portion 60, which are integrated at the end portion of the rail portion 30, extend in the direction perpendicular to the longitudinal direction of the vehicle body 20. The vehicle body connection portion 50 extends forward in the longitudinal direction of the vehicle body 20 and is connected to the vehicle body 23. The roof rail connection portion 40 and the B-pillar connection portion 60 are respectively connected to the roof rail 25 and the B-pillar 27.

Because the connection structure between the roof rail connection portion 40 and the roof rail 25 at the side of the B-pillar 27 is identical to that described with reference to FIG. 9 and FIG. 10, a description thereof will be omitted.

The B-pillar 27 may be inserted into and connected to the stepped tunnel portion of the B-pillar connection portion 60. In the instant case, an external side of the B-pillar 27 may be coupled to an external side of the B-pillar connection portion 60 by the FDS 64, and an internal side of the B-pillar 27 may be coupled to an internal side of the B-pillar connection portion 60 by the blind rivet 62.

The vehicle body 23 may be inserted into and connected to the stepped tunnel shape of the vehicle body connection portion 50. The upper side of the vehicle body 23 may be coupled to the upper side of the vehicle body connection portion 50 by the SPR 54 and the blind rivet 52. In the instant case, the SPR 54 may be provided as a single SPR 54. The blind rivet 52 may be provided as a plurality of blind rivets 52. A pair of blind rivets 52 may be disposed in the longitudinal direction of the vehicle body 20.

Furthermore, the lower side of the vehicle body 23 may be coupled to the lower side of the vehicle body connection portion 50 by the blind rivet 52. In the instant case, the blind rivet 52 may be provided as a plurality of blind rivets 52. The two blind rivets 52 and the four blind rivets 52 may be respectively provided on the upper surface and the lateral surface of the lower side of the vehicle body 23.

Meanwhile, the guard bracket 22 may be coupled to cover the external surface of the B-pillar connection portion 60. The guard bracket 22 may be coupled to the external surface of the B-pillar connection portion 60 by the FDS 66.

According to the exemplary embodiment of the present disclosure as described above, the vehicle-body-integrated upper rail may be produced as a single component by use of an aluminum casting process method, which may eliminate in advance the factor of degradation of assembling quality due to tolerance that occurs at the time of assembling a plurality of components.

Furthermore, it is possible to prevent a dimension defect between components, an assembling defect, and deteriorations in watertightness performance and noise, vibration, and harshness (NVH) performance caused by a gap and void between components.

Furthermore, it is possible to provide excellent trajectory dimension quality to the single component, which may solve a problem with the connection between the vehicle body component and the bearing, prevent the occurrence of noise, and reduce abrasion progression while the sliding door operates.

Furthermore, the vehicle-body-integrated upper rail, which forms the framework structure of the vehicle body and is configured in longitudinal/transverse/upward and downward directions, is provided, which may improve rigidity of the vehicle body.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle-body-integrated upper rail structure, which is provided at an upper side of a door opening portion formed in a vehicle body, the vehicle-body-integrated upper rail structure comprising:

a rail portion including a rail opening that provides a sliding route for a door and is formed in a longitudinal direction of the vehicle body;

a pillar connection portion extending from the rail portion toward a lower side of the vehicle body and connected to a pillar; and a roof rail connection portion extending from an upper end portion of the rail portion toward a center portion of the vehicle body and connected to a roof rail of the vehicle body, wherein the rail opening is formed through the rail portion in an upward and downward direction, and wherein the rail opening is formed convex toward an outside of the vehicle body in the longitudinal direction of the vehicle body.

2. The upper rail structure of claim 1, further including a vehicle body connection portion extending from the upper end portion of the rail portion in the longitudinal direction of the vehicle body and connected to the vehicle body.

3. The upper rail structure of claim 1, wherein the pillar includes a B-pillar and a C-pillar, wherein the pillar connection portion includes:

a B-pillar connection portion extending from a lower end portion of the rail portion toward the lower side of the vehicle body and connected to the B-pillar; and a C-pillar connection portion extending from the lower end portion of the rail portion toward the lower side of the vehicle body and connected to the C-pillar.

4. The upper rail structure of claim 1, wherein a protrusion is formed to protrude toward an inside of the rail opening so that a bearing connected to a door arm is mounted on the protrusion and rolls on the protrusion.

5. The upper rail structure of claim 1, wherein the roof rail connection portion is formed concave toward the lower side of the vehicle body to be connected to and overlap an end portion of the roof rail.

6. The upper rail structure of claim 5, wherein an end portion of the roof rail connection portion is connected to the end portion of the roof rail by a blind rivet.

7. The upper rail structure of claim 2, wherein the vehicle body connection portion includes a stepped tunnel portion to be connected to and overlap an end portion of the vehicle body.

8. The upper rail structure of claim 7, wherein the vehicle body is inserted into and connected to the stepped tunnel portion of the vehicle body connection portion.

9. The upper rail structure of claim 8, wherein an upper side of the vehicle body is coupled to an upper side of the vehicle body connection portion by a self-piercing rivet (SPR), and a lower side of the vehicle body is coupled to a lower side of the vehicle body connection portion by a blind rivet.

10. The upper rail structure of claim 3, wherein the B-pillar connection portion and the C-pillar connection portion respectively include stepped tunnel portions to be connected to and overlap an end portion of the B-pillar and an end portion of the C-pillar.

11. The upper rail structure of claim 10, wherein the B-pillar is inserted into and connected to the stepped tunnel portion of the B-pillar connection portion.

12. The upper rail structure of claim 11, wherein an external side of the B-pillar is coupled to an external side of the B-pillar connection portion by a flow drill screw (FDS) and an internal side of the B-pillar is coupled to an internal side of the B-pillar connection portion by a blind rivet.

13. The upper rail structure of claim 10, wherein the C-pillar is inserted into and connected to the stepped tunnel portion of the C-pillar connection portion.

14. The upper rail structure of claim 10, wherein the C-pillar is connected to the stepped tunnel portion of the C-pillar connection portion by an FDS.

15. The upper rail structure of claim 10, wherein a guard bracket is coupled to cover an external surface of the B-pillar connection portion and an external surface of the C-pillar connection portion.

16. The upper rail structure of claim 14, wherein the guard bracket is coupled to the external surface of the B-pillar connection portion and the external surface of the C-pillar connection portion by FDSs.

* * * * *